United States Patent [19]
Elnashar et al.

[11] Patent Number: 5,499,344
[45] Date of Patent: Mar. 12, 1996

[54] PROGRAMMABLE DUAL PORT DATA UNIT FOR INTERFACING BETWEEN MULTIPLE BUSES

[75] Inventors: Khodor S. Elnashar, Richardson; Jay T. Cantrell, Dallas, both of Tex.; William Saperstein, San Carlos, Calif.

[73] Assignee: Texas Instruments Incorporated, Dallas, Tex.

[21] Appl. No.: 957,936

[22] Filed: Oct. 7, 1992

[51] Int. Cl.$^6$ .................................................. G06F 13/14
[52] U.S. Cl. .................... 395/250; 364/DIG. 1; 364/DIG. 2; 364/238.6; 364/239; 364/239.3; 364/927.92; 364/927.93
[58] Field of Search .................. 364/DIG. 1 MS File, 364/DIG. 2 MS File; 395/200, 250, 275, 325, 500, 550; 340/825.5

[56] References Cited

U.S. PATENT DOCUMENTS

| | | | |
|---|---|---|---|
| 5,255,375 | 10/1993 | Crook et al. | 395/325 |
| 5,265,216 | 11/1993 | Murphy et al. | 395/325 |
| 5,319,678 | 6/1994 | Ho et al. | 375/106 |

Primary Examiner—Robert B. Harrell
Attorney, Agent, or Firm—Mark A. Valetti; W. James Brady, III; Richard L. Donaldson

[57] ABSTRACT

An embodiment of the present invention is a digital circuit (block 12 of FIG. 1) for interfacing between a first bus (10), which can operate synchronously or asynchronously, and a second bus (14), which can operate synchronously or asynchronously, the digital circuit comprising: compelled data decoders (40 and 50) connected to the first bus for receiving compelled data and decoding the compelled data; packet data decoders (52 and 45) connected to the first bus for receiving packet data and decoding the packet data; a digital storage device (28), preferably a FIFO comprising a plurality of write banks and a plurality of read banks or a FIFO comprising a plurality of dual-ported RAMs, having an input selectively connected to the compelled data decoders, the packet data decoders, and the second bus (via lines 44) for storing the decoded data and data from the second bus, the digital storage device additionally includes an output connected to the second bus (via lines 42) for outputting the stored decoded data to the second bus; compelled data encoders connected to the output of the digital storage device for encoding the stored data received from the second bus and outputting the encoded data to the first bus; and packet data encoders (34 and 36) connected to the output of the digital storage device for encoding the stored data received from the second bus and outputting the encoded data to the first bus. Preferably, multiple bits of data are progressively written into each write bank of the digital storage device within a clock cycle whereby the data is stored at a rate higher than the FIFO could store with a single bank. The first bus can operate synchronously or asynchronously and the second bus can also operate synchronously or asynchronously. The first and second buses can operate at different clock rates and have different data widths.

14 Claims, 2 Drawing Sheets

PROGRAMMABLE DUAL PORT DATA UNIT FOR INTERFACING BETWEEN MULTIPLE BUSES

FIELD OF THE INVENTION

This invention relates generally to computers and specifically relates to data buffering between two independent communication busses.

BACKGROUND OF THE INVENTION

Futurebus+ is an IEEE specification for high-performance backplane-based computing that permits architectural consistency across a broad range of computer products. Key attributes of Futurebus+ are discussed in the article of J. Theus in *Microprocessor Report*, Volume 6, Number 7, May 27, 1992. Futurebus+ is a comprehensive architectural specification designed as an open standard; that is, an interface standard for which there are no preconceived restrictions in terms of architecture, microprocessor, and software implementations. It is also a standard explicitly designed to support multiple generations of computer technology, leading to system speeds significantly greater than current systems.

Futurebus+ provides a 64-bit architecture with a compatible 32-bit subset and data path extensions to 128 or 256 bits. The protocols, while providing headroom for system growth, explicitly support real-time scheduling, fault tolerance, and high-availability and high-reliability systems.

The logical layering of the Futurebus+ specifications offers a wealth of architectural features with which designers may implement a wide variety of systems. Both loosely coupled and tightly coupled compute paradigms are supported via the parallel protocols and in the message-passing and cache-coherence protocols. The control and status registers provide a standard software interface to the Futurebus+, easing the development and transportability of I/O drivers and other system software.

Unlike older standard buses, Futurebus+ is optimized for a backplane environment. Backplane transceiver logic (BTL) circuits provide incident-wave switching capability (thus no set-up and hold time), low capacitance with high current drive capability, and controlled one-volt voltage swings for better noise margins.

While the present invention can be used in conjunction with Futurebus+, a few aspects of the present invention are: buffering between multiple transfer types, transferring data between multiple time domains, and buffering data between different size busses. The resolution of the problems associated with these issues is the basis of the instant invention.

Three modes of transferring information have evolved over the past several years: high speed packet transfers, asynchronous compelled transfers, and synchronous transfers. Interfacing to all three protocols can lead to architectural and performance problems in the buffering agent.

Packet transfers involve sending a stream of data from one agent to another at a clock rate. At each dock edge, data is captured. The dock can be embedded in the data stream, sent on a separate wire from the source, or be a common frequency between each agent where the receiving agent extracts phase information from start and stop bits, like UARTs. The main limiting factors in packet transfers are the signal integrity (electrical characteristics and electrical environment), bit to bit parallel skew, and serial bit jitter/symetry.

Futurebus has excellent signal integrity; bit to bit parallel skew is avoided by locking onto the phase of the data stream using a pre-determined clock rate; and serial bit jitter/symmetry is tightly controlled in the transceiver. These factors result in a very high-speed packet transfer mechanism, twice as fast as existing CMOS fifo's. An object of the present invention is to provide an architecture that can operate with fifo's which operate at only half the speed of the Futurebus packet transfer.

Compelled asynchronous transfers use a handshaking protocol to transfer data. In a compelled handshake the source supplies data and an indication that data is ready; and the destination receives the data and indicates that data has been received allowing the source to continue with the next operation. A three wire handshake is used on Futurebus+ to transmit data in a compelled way allowing multiple sources and/or destinations. The handshake allows multiple slaves to send data (broadcall) or receive data (broadcast) from the master.

Interfacing between this protocol and a fifo requires asynchronous control. Another object of the present invention is to provide an architecture in which the fifo can operate in both compelled and packet modes.

Synchronous transfers can include single or burst data transfers. Burst data transfers resemble packet transfers where a clock is sent along with the data, except that the entire bus, master and slaves, are all operating at the same speed.

A time domain is a group of circuitry which utilizes a single clock and phase or a common asynchronous protocol. A time domain boundary is the place where two time domains meet. Data crossing a time domain boundary may become corrupted if care is not taken in design of the time domain boundary buffers.

There are two primary mechanisms for data buffering across a time domain boundary: First-In-First-Out (FIFO) buffering configuration and dual-ported random access memory (RAM) with locked control. An aspect of the present invention is combining the features of a dual-ported RAM with the simplicity of FIFO accessing. This allows versatile addressing of accesses while avoiding locking mechanisms.

The FIFO consists of a memory that is accessible by the source of data anytime there is space available; it is available to the destination anytime there is data available from the source. This is the usual way to interface between two time domains.

Dual-ported RAMs are a more versatile form of time domain boundary buffer. They allow reading data in a different order than it was written in: based upon address rather than write order. Dual-ported RAMs provide two ways, ports, to access a common memory element. Locks are used to prevent reading from a memory element while it is being written.

Finally, the interface must handle bus size buffering. Futurebus+ and the host interface can both be configured to be 32 or 64 bits wide. One bus can be 32 bits wide and the other can be 64 bits wide. This my lead to byte order problems as data is dynamically transferred from one port to the other. This problem is typically avoided by constraining each port to the same size, thereby avoiding dynamic bus sizing problems.

SUMMARY OF THE INVENTION

An embodiment of the present invention is a digital circuit for interfacing between a first bus and a second bus, the digital circuit comprising: circuitry for receiving data and decoding data from a packet mode format or a compelled mode format; a digital storage device, preferably a FIFO or a dual-ported RAM, for storing the decoded data; circuitry for providing a timing signal to the digital storage device to enable the storage device to accept the decoded data multiple times in a clock cycle; and circuitry for encoding data into packet mode format or compelled format. The first and second buses can operate synchronously or asychronously, operate at different dock rates, and have different data widths.

Another embodiment of the present invention is a digital circuit for interfacing between a first bus and a second bus, the digital circuit comprising: compelled data decoders connected to the first bus for receiving compelled data and decoding the compelled data; packet data decoders connected to the first bus for receiving packet data and decoding the packet data; a digital storage device, preferably a FIFO comprising a plurality of write banks and a plurality of read banks or a FIFO comprising a plurality of dual-ported RAMs, having an input selectively connected to the compelled data decoders, the packet data decoders, and the second bus for storing the decoded data and data from the second bus, the digital storage device additionally includes an output connected to the second bus for outputting the stored decoded data to the second bus; compelled data encoders connected to the output of the digital storage device for encoding the stored data received from the second bus and outputting the encoded data to the first bus; and packet data encoders connected to the output of the digital storage device for encoding the stored data received from the second bus and outputting the encoded data to the first bus. Preferably, multiplebits of data are progressively written into each write bank of the digital storage device within a clock cycle whereby the data is stored at a rate higher than the FIFO could store with a single bank. The first bus can operate synchronously or asynchronously and the second bus can also operate synchronously or asynchronously. The first and second buses can operate at different dock rates and have different data widths.

DETAILED DESCRIPTION OF PREFERRED EMBODIMENTS

An important aspect of the present invention is information of any width or length, whether it is synchronous or asynchronous, and regardless of the protocol type (packet, compelled, or synchronous) can be transferred from a first block to a second block without a lengthy delay.

Figure 1:
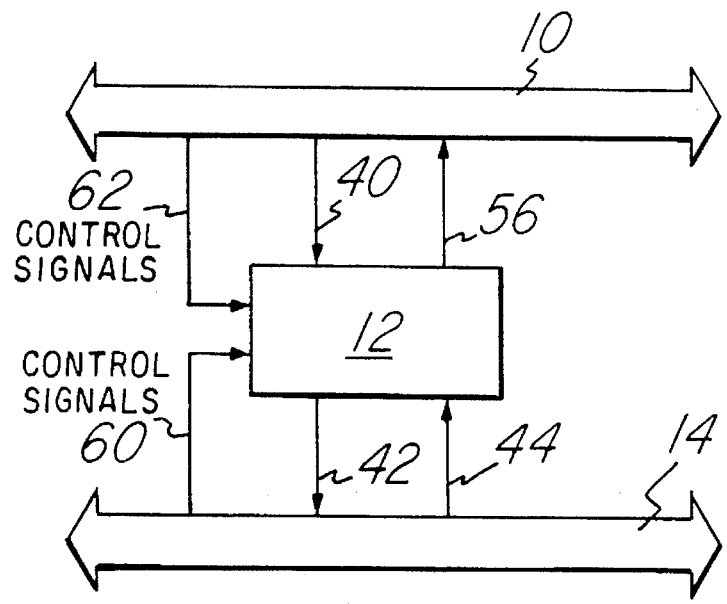
FIG. 1 is a block diagram of a system which includes the present invention.

FIG. 1 is a block diagram of a system which incorporates the present invention. The present invention is illustrated by block 12. Bus 10 is connected to block 12 via data lines 40 and 56 and control line 62, and bus 14 is also connected to block 12 via data lines 42 and 44 and control line 60. Bus 10 and bus 14 are connected to block 12 such that information can be transferred to bus 14 from bus 10 via block 12 or from bus 14 to bus 10 via block 12. As discussed above, an advantage of the present invention is that the information transferred between bus 10 and bus 14 do not have to have a uniform width or length, bus 10 and bus 14 can operate at different clock rates, and the information can even be transferred asynchronously. Another advantage of the present invention is that the information can be transferred in a compelled (single word) environment or a packet environment. Bus 14 can connect to any of the following: a bus, a central processing unit, memory, or any other type of synchronous circuitry.

Figure 2:
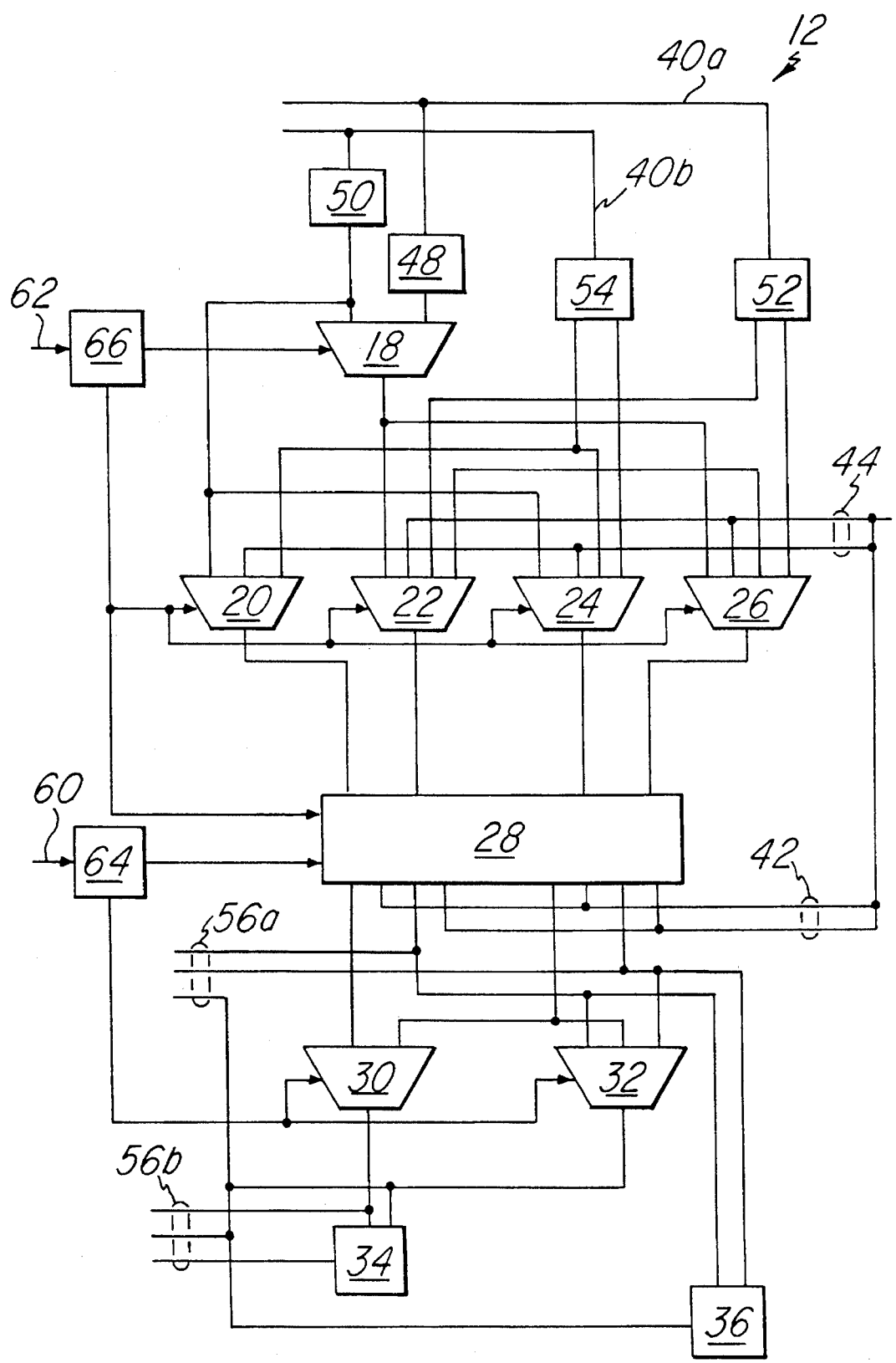
FIG. 2 is a circuit level diagram of an embodiment of the present invention.

FIG. 2 illustrates a circuit level diagram of a preferred embodiment of block 12 of FIG. 1. Lines 40a and 40b represent a grouping of conductors, preferably 32 conductors each, which carry information to latches 48 and 50 and packet decoders 52 and 54, respectively. If the information that is being written from a block (not shown), such as a memory, a central processing unit, or any other type circuitry, via bus 10 (FIG. 1) to bus 14 (FIG. 1) is using a compelled mode transfer then the lower bits, preferably bit 0 through 31, will be input to latch 50 via line 40b and the higher bits, preferably bits 32–63, will be input to latch 48 via line 40a. If the information is transferred in a packet mode then the lower bits will be input to packet decoder 54 via line 40b and the higher bits will be input to packet decoder 52 via line 40a. In cases where the information is transferred solely by the lower bit lines 40b, then the higher bit lines 40a become inactive and the corresponding latch and packet decoder also become inactive. A similar situation also occurs for compelled transfers and packet transfers. In compelled transfers, also known as compelled mode, the packet decoders 52 and 54 remain inactive and the latches 48 and 50 are used. Similarly, in packet transfers, also known as packet mode, the latches 48 and 50 remain inactive and the packet decoders 52 and 54 are used. Outputs of latches 48 and 50 are connected to the inputs of MUX 18, and the output of MUX 18 is connected to an input of MUX 22 and 26 for selectively coupling the information received by the latches 48 and 50 to FIFO 28.

After the information is received by the packet decoders 52 and 54 or the latches 48 and 50, the information is input into selective ports of a FIFO 28 via MUX's 20, 22, 24, and 26. Preferably, the clocking of the MUX's and the FIFO is either derived by the handshake signals associated with a compel mode transfer or by the clock associated with a packet mode transfer.

Figure 3:
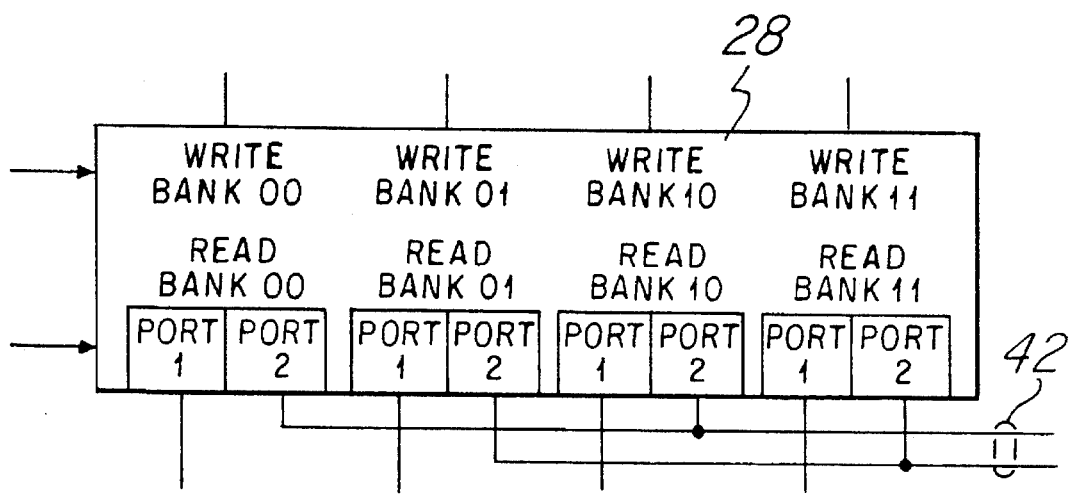
FIG. 3 is a more detailed block diagram of block 28, shown in FIG. 2.

Referring to FIG. 3, FIFO 28 is, preferably, divided into two or more separate FIFO's for communicating with burst transfers that are twice as fast as each individual FIFO, and each of the separate FIFO's has one or more inputs. In one preferred embodiment, FIFO 28 includes four dual-ported RAM's with locked control. Each RAM bank is addressed when the two least significant bits are 00, 01, 10, and 11, respectively. Also, each RAM has one write input port and two tri-stated output read ports. The write input of each bank is selected by the multiplexer, MUX, connected to that input. The source of each input is either from latch 50, latch 48, packet decoder 54, packet decoder 52, or bus 44. Since each bank has two output ports, one port connected to bus 42 and the other output port connected to either packet encoders 34 and 36 or to bus 56. The select signals which control the MUX's and the control signals for the FIFO's are decoded by both decoder blocks 64 and 66. The write/read control logic generates the correct address and writes/reads the word to the right bank. For example, if each bus is 64 bits wide and four words are received (a word is 32 bits wide), the first and second words are written to banks 00 and 01, respectively, at the first clock edge, and the third and fourth words are written to banks 10 and 11, respectively, at the second clock edge of the same clock cycle. Therefore, this architecture allows writing four words using only two clock edges of a single dock cycle. The architecture of the instant invention allows reading four words at the same speed as writing four words. Conventional FIFO's are not able to handle this mount of data at such a high speed.

Referring to FIG. 2, decoders 64 and 66 determine the direction of the data flow (read/write), bus size (either 32 or 64bits wide), mode of transfer (packet mode or compelled mode), and the clocking for each bus.

MUXs 20, 22, 24, and 26 also have an input connected bus 14 of FIG. 1 via lines 44. MUXs 30 and 32 and packet encoder 36 are connected to several of the outputs of FIFO 28. Packet encoder 34 is connected to the output of MUX 30 and 32. Information which is transferred from bus 14 (FIG. 1) to bus 10 (FIG. 1) is input to FIFO 28 via MUXs 20, 22, 24, and 26 and output to bus 10 (FIG. 1) via MUX's 30 and 32 and lines 56a and 56b. If the information is to be in packet format, then the information must also be encoded by packet encoders 34 and 36. Since this FIFO is implemented as RAM cells, offset addressing is available into the middle of a data stream. This feature is useful when the first datum needed is not the first datum received.

Although the invention has been described with reference to a preferred embodiment herein, this description is not to be construed in a limiting sense. Various modifications of the disclosed embodiments will become apparent to persons skilled in the art upon reference to the herein description. It is therefore contemplated that the appended claims will cover any such modifications or embodiments as fall within the true scope of the invention.

What is claimed is:

1. A digital circuit for interfacing between a first bus and a second bus, said digital circuit comprising:

circuitry for receiving data and decoding data from a packet mode format or a compelled mode format, said circuitry for receiving data and decoding data provides decoded data;

a digital storage device connected to said circuitry for receiving and decoding data, said digital storage device for storing said decoded data;

circuitry for providing a timing signal to said digital storage device to enable said storage device to accept said decoded data multiple times in a clock cycle said circuitry for providing a timing signal to said digital storage device is connected to said digital storage device; and circuitry for encoding data into packet mode format or compelled format, said circuitry for encoding data is connected to said digital storage device.

2. The digital circuit of claim 1, wherein said first and second buses operates synchronously or asychronously.

3. The digital circuit of claim 2, wherein said buses operate at different clock rates.

4. The digital circuit of claim 2, wherein said buses have different data widths.

5. The digital circuit of claim 1, wherein said digital storage device is a FIFO.

6. The digital circuit of claim 1, wherein said digital storage device is a dual-ported RAM.

7. A digital circuit for interfacing between a first bus and a second bus, said digital circuit comprising:

compelled data decoders connected to said first bus for receiving compelled data and decoding said compelled data, and said compelled data decoder provides first decoded data;

packet data decoders connected to said first bus for receiving packet data and decoding said packet data, and said packet data decoder provides second decoded data;

a digital storage device having an input selectively connected to said compelled data decoders, said packet data decoders, and said second bus for storing said first decoded data, second decoded data and data from said second bus, said digital storage device additionally includes an output connected to said second bus for outputting said stored decoded data to said second bus;

compelled data encoders connected to said output of said digital storage device for encoding said stored data received from said second bus and outputting said encoded data to said first bus; and packet data encoders connected to said output of said digital storage device for encoding said stored data received from said second bus and outputting said encoded data to said first bus.

8. The digital circuit of claim 7, wherein said digital storage device is a FIFO.

9. The digital circuit of claim 8, wherein said FIFO includes a plurality of write banks and a plurality of read banks.

10. The digital circuit of claim 9, wherein multiple bits of data are progressively written into each write bank of said FIFO within a clock cycle whereby said data is stored at a rate higher than said FIFO could store with a single bank.

11. The digital circuit of claim 8, wherein said FIFO includes a plurality of dual-ported RAMs.

12. The digital circuit of claim 7, wherein said first bus operates synchronously or asynchronously and said second bus operates synchronously or asynchronously.

13. The digital circuit of claim 7, wherein said first and second buses operate at different clock rates.

14. The digital circuit of claim 7, wherein said first and second buses have different data widths.

* * * * *